(12) United States Patent
Egner-Walter et al.

(10) Patent No.: US 8,381,348 B2
(45) Date of Patent: Feb. 26, 2013

(54) WIPER ARM/WIPER BLADE CONNECTION AND WIPER BLADE

(75) Inventors: Bruno Egner-Walter, Heilbronn (DE); Michael Schauble, Vaihingen/Enz (DE)

(73) Assignee: Valeo Systèmes d'Essuyage, La Verriere (FR)

( * ) Notice: Subject to any disclaimer, the term of this patent is extended or adjusted under 35 U.S.C. 154(b) by 243 days.

(21) Appl. No.: 13/119,495

(22) PCT Filed: Sep. 21, 2009

(86) PCT No.: PCT/EP2009/006790
§ 371 (c)(1),
(2), (4) Date: Mar. 17, 2011

(87) PCT Pub. No.: WO2010/034445

PCT Pub. Date: Apr. 1, 2010

(65) Prior Publication Data
US 2011/0185531 A1    Aug. 4, 2011

(30) Foreign Application Priority Data
Sep. 26, 2008  (DE) .......................... 10 2008 049 269

(51) Int. Cl.
*B60S 1/46* (2006.01)
*B60S 1/52* (2006.01)
*B60S 1/40* (2006.01)

(52) U.S. Cl. ............... 15/250.04; 15/250.06; 15/250.07; 15/250.32; 219/202

(58) Field of Classification Search ............... 15/250.32, 15/250.04, 250.01, 250.02, 250.05–250.09, 15/250.43, 250.44, 250.361; 219/202
See application file for complete search history.

(56) References Cited

U.S. PATENT DOCUMENTS
2008/0263806 A1* 10/2008 Egner-Walter et al. .... 15/250.01

FOREIGN PATENT DOCUMENTS
| DE | 19 89 712 U | 7/1968 |
| DE | 44 15 065 A1 | 11/1995 |
| DE | 100 00 372 A1 | 8/2001 |
| DE | 10 2004 056 835 A1 | 6/2006 |
| DE | 10 2005 030 972 A1 | 1/2007 |
| GB | 644 048 A | 10/1950 |
| JP | 10-329655 A1 | 12/1998 |

OTHER PUBLICATIONS
International Search Report w/translation from PCT/EP2009/006790 dated Nov. 27, 2009 (4 pages).

* cited by examiner

*Primary Examiner* — Mark Spisich
*Assistant Examiner* — Andrew A Horton
(74) *Attorney, Agent, or Firm* — Osha Liang LLP (57) ABSTRACT

The invention relates to a wiper arm/wiper blade connection between a wiper blade (3, 3a, 3b) and a wiper arm (1) of a windscreen wiper installation for vehicles, comprising a wiper blade adapter (4) which is mounted on the wiper blade for detachably fastening the wiper blade to the wiper arm. The wiper blade is designed as a flat wiper blade and comprises at least one nozzle opening (11.1, 12.1) and/or at least one spray or distribution channel (11, 12) having nozzle openings for applying a cleaning or washing liquid to a vehicle screen on at least one wiper blade longitudinal side. The connection further comprises at least one liquid connection (32, 33) on the wiper blade adapter on the adapter end for detachably connecting the at least one nozzle opening and/or the at least one spray or distribution channel to at least one outer liquid line (14) for supplying the washing or cleaning liquid, namely via a coupling unit (39) that is connected to the at least one liquid line and detachably connected to the at least one liquid line. The invention is characterized in that, if the wiper blade is configured as an electrically heated wiper blade, the wiper blade adapter has at least one electrical connection (35) in addition to the at least one liquid connection, said electrical connection being detachably connected to the at least one outer electrical line (15) via the coupling unit to supply the heating current to the wiper blade.

20 Claims, 11 Drawing Sheets

WIPER ARM/WIPER BLADE CONNECTION AND WIPER BLADE

The invention refers to a wiper arm/wiper blade connection for windscreen wiper modules for vehicles according to the generic term of patent claim 1 and to a wiper blade according to the generic term of claim 14.

Wiper blades for use in windscreen wiper modules of vehicles are known in various different embodiments. Flat wiper blades are also particularly known (DE 10 2004 056 835 A1, DE 100 00 372 A1), which generally consist of a wiper rubber made of a elastic rubber material forming a wiping lip extending in the longitudinal direction of the wiper blade in addition to a strip-like or profiled rail-shaped wiper blade body (wiping strip) having at least one spring rail, on which (wiper blade body) the wiper rubber is held. The respective wiper blade is detachably connected to the wiper arm of the windscreen wiper module by means of a wiper blade adapter, with the respective wiper blade adapter being of at least two-part design and to be more precise, consisting of an adapter section on the wiper arm side connected to the wiper arm at least in the assembled state and of an adapter section on the wiper arm side provided on the wiper blade, which overlaps the wiper blade and the latter's wiper blade body and/or the spring rail and/or the wiper rubber in the manner of a slide on the upper side of the wiper blade. In these known flat wiper blades, a spray or distribution duct with a large number of jet openings for application of a cleaning or washing fluid to the vehicle windscreen is provided on at least one longitudinal side of the wiper blade. By means of a liquid or fluid connection provided on the wiper blade side, i.e. on the wiper blade adapter, the at least one distribution or spray duct is connected to at least one external fluid line generally composed of a flexible tube, by means of which the cleaning or washing fluid is supplied in a controlled manner to the distribution or spray duct from a supply unit on the vehicle side.

Electrically heatable wiper blades are furthermore known (JP 10329655, DE 19 89 712 U), which are however executed as bow wiper blades with bows or bowlike structures. An electric heating element respectively composed of a heating filament or a heating foil is provided in the area of the wiper rubber or the wiper blade body (wiping strip) bearing the wiper rubber. The heating current is supplied to the heating element by means of at least one electrical conductor running also over at least part of its length along the wiper arm, to which the heatable wiper blade is subsequently connected by means of an electrical plug/socket connection.

"Flat wiper blades" are now also known as "flat wiperblades" or "flat-bar wiper blades" or "unarticulated wiper blades". In the sense of the present invention, these flat wiper blades generally consist of a wiper rubber having a wiping lip, wherein the wiper rubber is retained on or fixed to a spring rail or two spring rails and a connecting device or a wiper blade adapter for connection to a wiper arm drivable for the wiping movement is mounted on the spring rail or on the spring rails. With only one spring rail, the latter is arranged in a longitudinal channel of the wiper rubber or on the rear of the wiper rubber. With two spring rails, the latter engage in longitudinal grooves on the opposite long outer sides of the wiper rubber. In a further general design of flat wiper blades, the rear section of the wiper rubber is received in an elongated elastic profiled body, likewise a spring rail or several spring rails. If the profiled body is itself equipped with the necessary spring properties, additional spring rails can be dispensed with. The connecting device for connecting the wiper blade to the wiper arm is mounted on this profiled body in this case. Depending on the purpose, additional elements, such as spoilers or heating devices or elements for dispensing washing fluid or the like may be provided or mounted on the wiper blade.

Contrasting with the flat wiper blades are the so-called "bow wiper blades". A typical example of bow wiper blades is illustrated in DE 44 15 065 A1 (FIG. 1 of the latter). Bow wiper blades possess a carrying frame, formed of bows articulated to each other in the manner of a balance-beam, the main bow of which is connectable to the wiper arm by means of a wiper blade adapter. The wiper rubber is retained and guided on the carrying frame by inwards oriented claw pairs on the bow ends of the lowest hierarchical level of the bow structure engaging in grooves on the longitudinal sides of the wiper rubber. Spring rails inset in the wiper rubber ensure uniformity of the contact pressure transferred to the wiper rubber via the bows.

The purpose of the invention is to demonstrate a wiper arm/wiper blade connection which, as a mechanical, hydraulic and simultaneously also electrical connection, allows simplified connection and separation of an electrically heatable wiper blade, equipped at the same time with spray jets for application of a cleaning or washing fluid to the vehicle windscreen, to the wiper arm and from the wiper arm. In order to solve this problem, a wiper blade/wiper arm connection according to patent claim 1 is developed.

The purpose of the invention is furthermore to demonstrate a wiper blade that presents spray jets or openings for application of the washing or cleaning fluid to the vehicle windscreen, is electrically heatable and can be easily attached to and removed from a wiper arm of a windscreen wiper module. In order to solve this problem, a wiper blade according to patent claim 14 is developed.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in an example of embodiment based on the figures.

Figure 1:
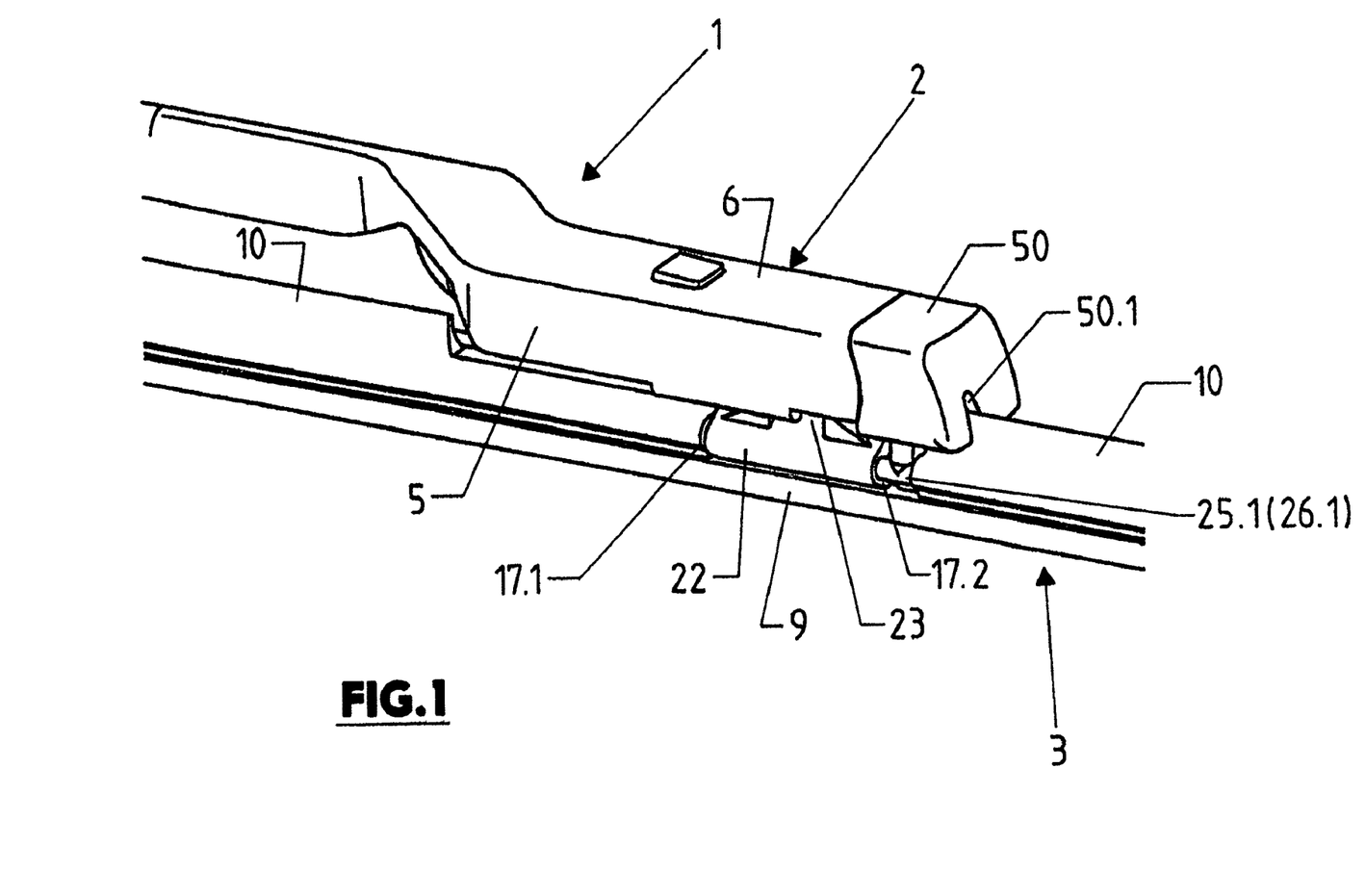
FIG. 1 shows a simplified perspective partial representation of the wiper arm of a windscreen wiper module together with a wiper blade fixed to the wiper arm.
Figure 2:
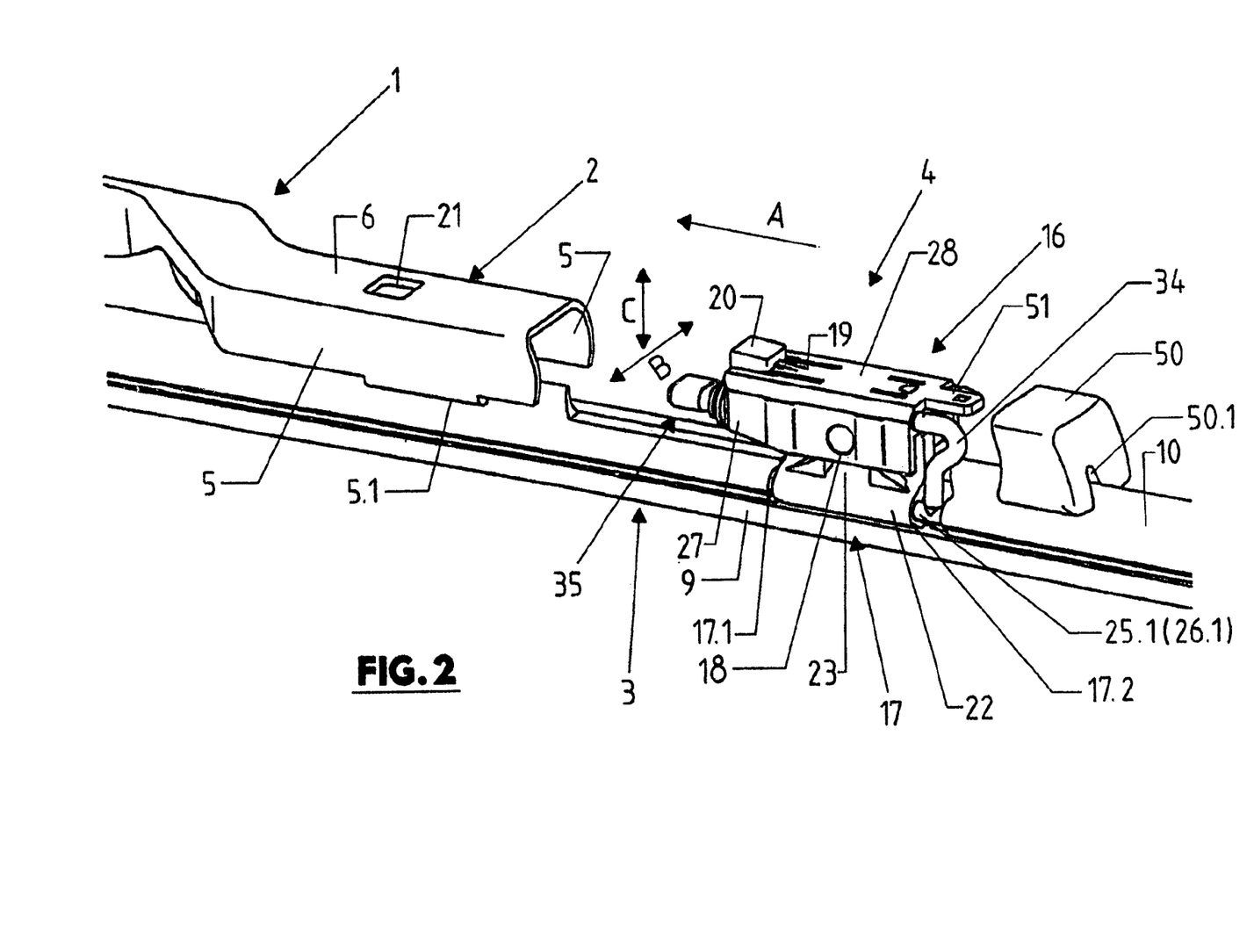
FIG. 2 shows an illustration similar to that of FIG. 1, but with the wiper blade removed from the wiper arm.
Figure 4:
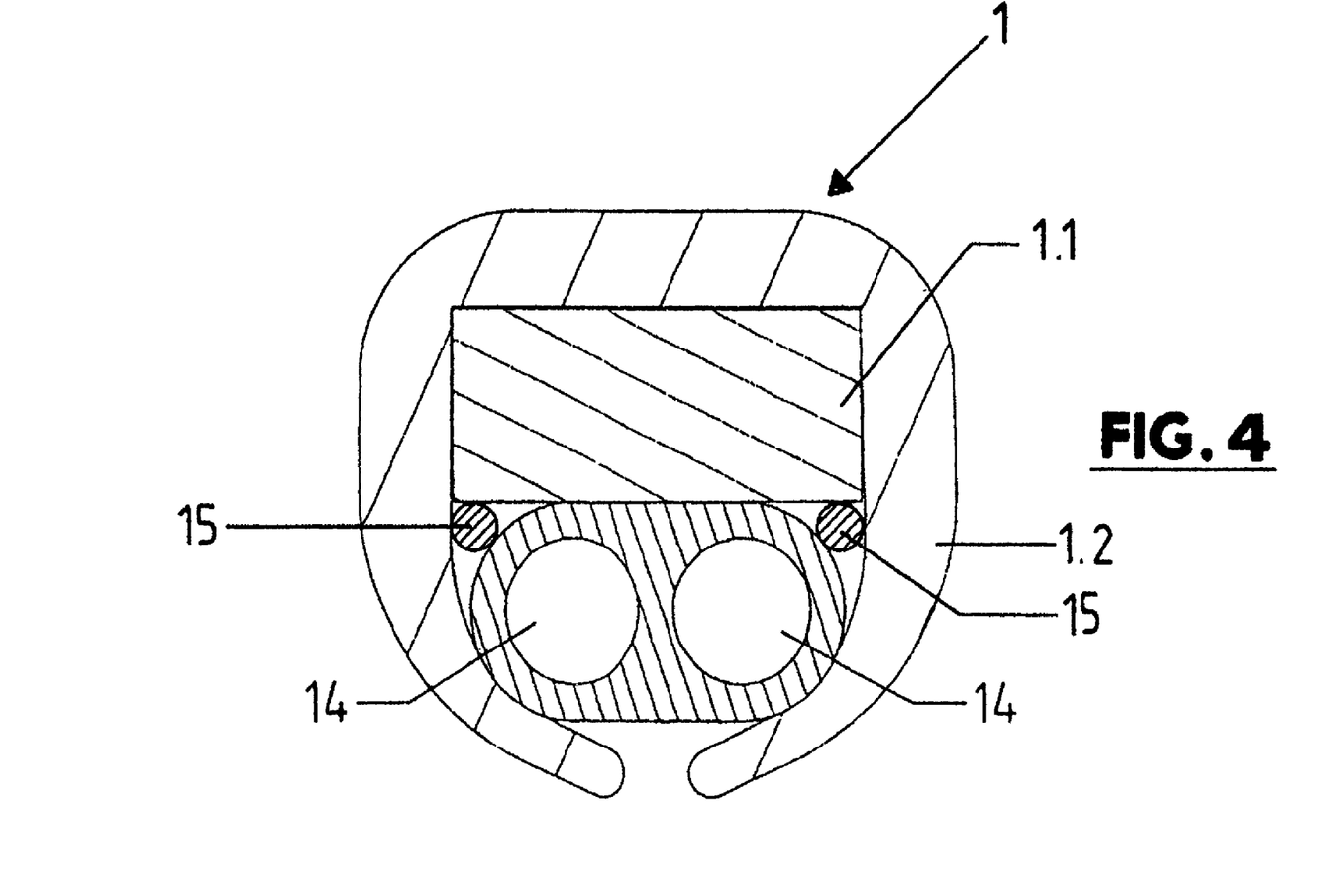
FIG. 4 shows a section through the wiper arm of FIGS. 1 and 2.
Figure 5:
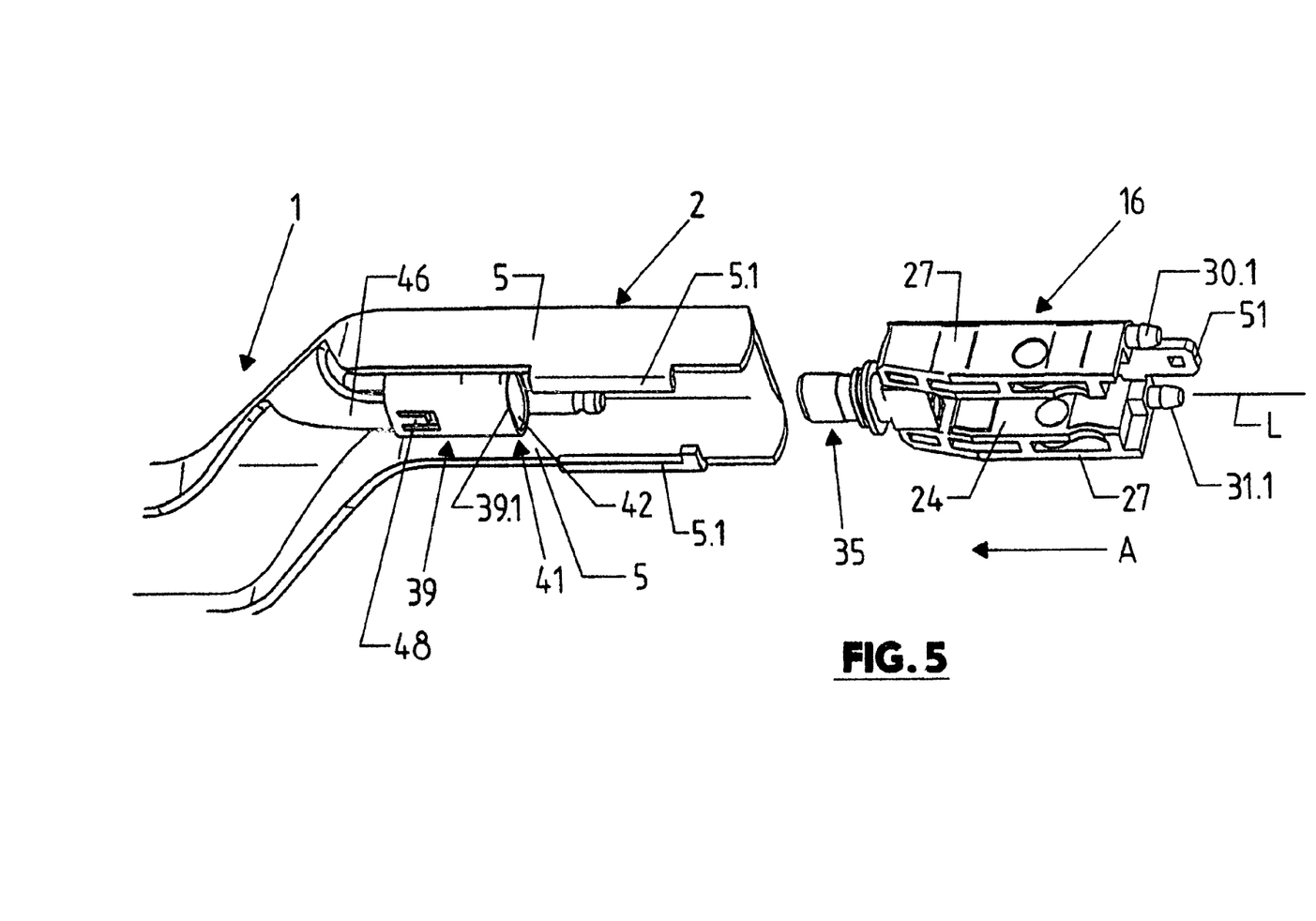
FIGS. 5 and 6 respectively show in a perspective bottom view the end of the wiper arm on the wiper blade side together with an adapter section on the wiper arm side of a two-part adapter and to be more precise with the adapter section removed from the wiper arm and connected to the wiper blade.
Figure 6:
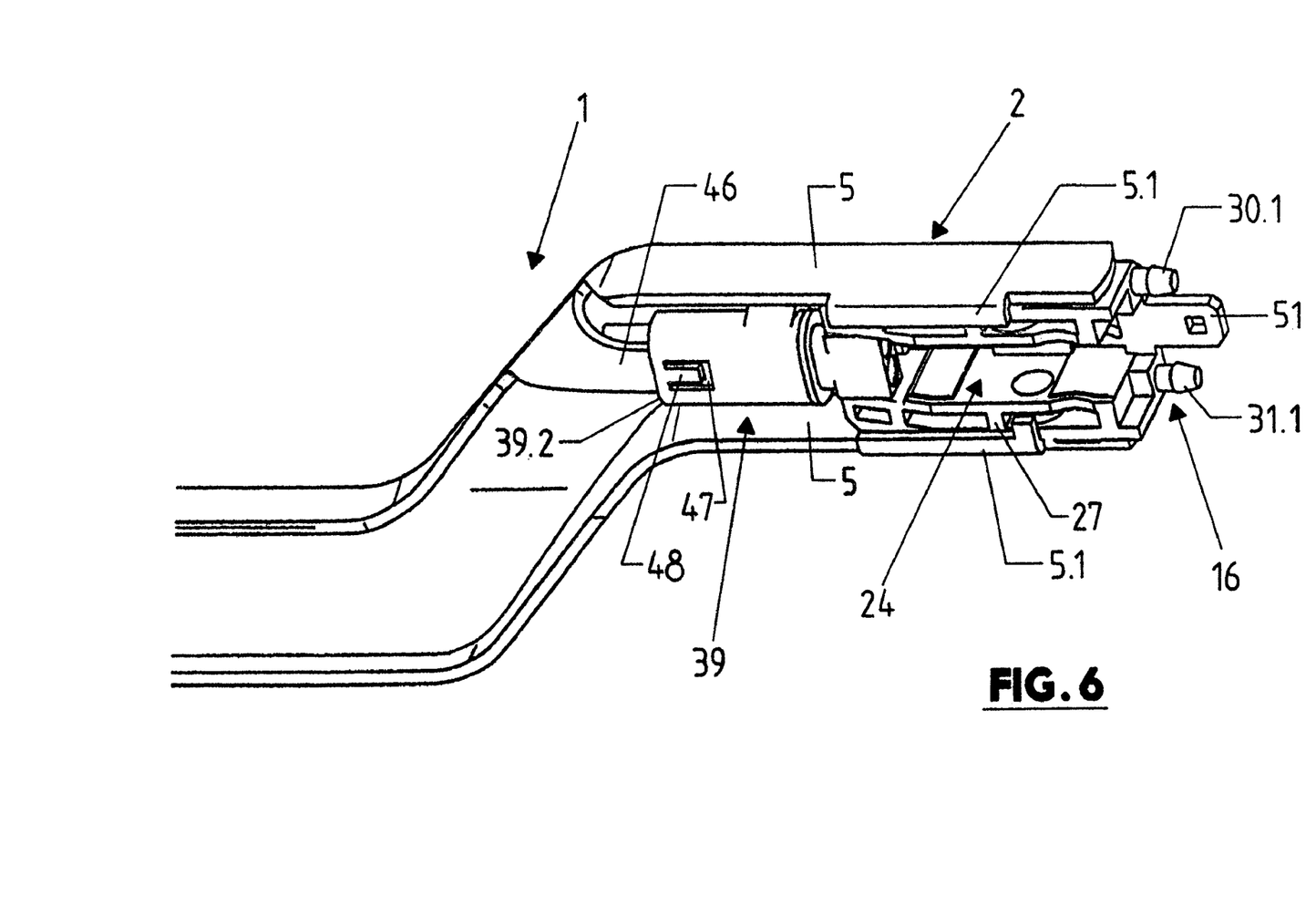

In the figures, 1 is the wiper arm of a windscreen wiper module for vehicle windscreens (vehicle front windscreens) otherwise not further illustrated. Essentially only the end of the wiper arm 1 on the wiper blade side is respectively illustrated in the figures, which is also manufactured in an intrinsically known manner over a sublength as a wiper arm rod 1.1 from a metallic rod profile (FIG. 4). The wiper arm 1 is provided with a receptacle 2 on its end on the wiper blade side and to be more precise for detachable fixing of the wiper blade 3 and a wiper blade adapter 4 provided, i.e. preinstalled, on the wiper blade in the manner described in further detail below. In order to form the receptacle 2, the end of the wiper arm 1 on the wiper blade side presents a U profile open to the underside of the wiper arm and to the installed wiper blade 3 and also to the free end of the wiper arm 1 with two shanks and a yoke section connecting these shanks. The free edge of each shank 5 is provided with an angled portion 5.1 projecting into the U profile. The wiper arm 1 is for example manufactured from a metallic flat material, for example steel, by bending and punching, at least in the area of its end forming the receptacle 2.

Figure 3:
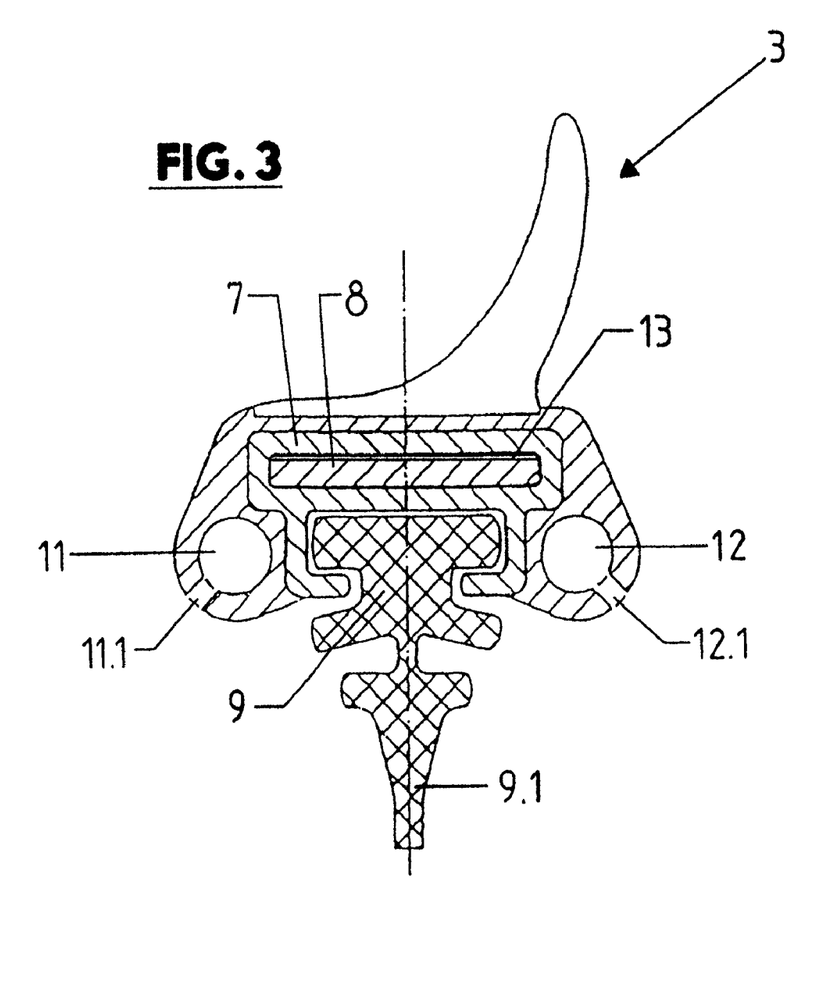
FIG. 3 shows a simplified representation of a section through the flat wiper blade in FIGS. 1 and 2.

The wiper blade 3 is realised as a flat heatable wiper blade. It consists in the embodiment presented among other aspects of a wiper blade body or a profile rail 7, extending over the entire length of the wiper blade 3 and enclosing a spring rail 8. The wiper rubber forming the wiping lip 9.1 and likewise extending over the entire length of the wiper blade in addition to a spoiler profile are retained on the profile rail 7. The wiper blade 3 is furthermore provided with two distribution or spray ducts 11 and 12 respectively extending over a longitudinal side of the wiper blade and formed in the profile rail 7, which respectively present a large number of jet openings 11.1 and 12.1 for application of a cleaning or washing fluid, for example for application of water with cleaning and/or antifreeze additives to the vehicle windscreen not illustrated. A heating element 13 designed as heating foil is provided on the spring rail 8 or on the profile rail 7.

The spray ducts 11 and 12 are supplied with the spraying and cleaning fluid via fluid lines 14 laid in the wiper arm 1 and formed of at least one flexible tube line, with which the spray ducts 11 and 12 are respectively connected in the area of the wiper blade adapter 4 in the manner described in further detail below. Two fluid lines 14 are provided in the embodiment presented, each formed by one duct of a double flexible tube.

The heating element 13 is connected in the manner described in further detail below likewise in the area of the wiper blade adapter 4 to at least one external connecting lead 15 running among other aspects in the wiper arm in the manner described in further detail below for supplying the heating current. FIG. 4 shows the attachment of fluid lines 14 and the double flexible tube in addition to the lines 15 to the wiper arm 1 and on the sublength of the wiper arm 1 formed by the wiper arm rod 1.1 with the aid of clips 1.2.

The wiper blade adapter 4 is realised in two parts and to be more precise, consisting of an adapter section 16 on the wiper arm side and an adapter section on the wiper blade side, which is firmly connected to the wiper blade 3 and indeed in such a manner that the adapter section 17 overlaps the wiper blade 3 and the wiper blade body or the profile rail 7 in the manner of a slide on the upper side of the wiper blade. Both adapter sections 16 and 17 are articulated to one another by means of a hinge bolt 18, such that the wiper blade 3 with the wiper blade adapter 4 installed on the wiper arm 1 is provided to be slightly pivotable on the wiper arm 1 around the axis of the hinge bolt 18.

For mechanical connection of the wiper blade 3 to the wiper arm 1, the adapter section 16 can be pushed into the receptacle 2 from the free end of the wiper arm 1 in assembly direction indicated by the arrow A in FIG. 2, i.e. in approximately the longitudinal direction of the wiper blade 3 and the adapter section and can be anchored in the receptacle 2 by catch engagement. For this purpose, the upper side of the adapter section 16 is designed with a spring tongue 19 with a moulded on catch 20 formed by a protrusion, which with the adapter section 16 fully inserted into the receptacle 2 engages in a mating catch formed by an opening 21 in the yoke section 6, such that the adapter section 16 and therefore the wiper blade adapter 4 is overall retained positively in the receptacle 2, with the internal surfaces of the receptacle 2 and the shanks 5 and the yoke section 6 being in close contact with the lateral surfaces and the upper side of the adapter section 16 and this adapter section being engaged behind on its underside facing the wiper blade 3 by the angled portions 5.1. The adapter sections 16 and 17 are mouldings, preferably made of plastic.

Figure 7:
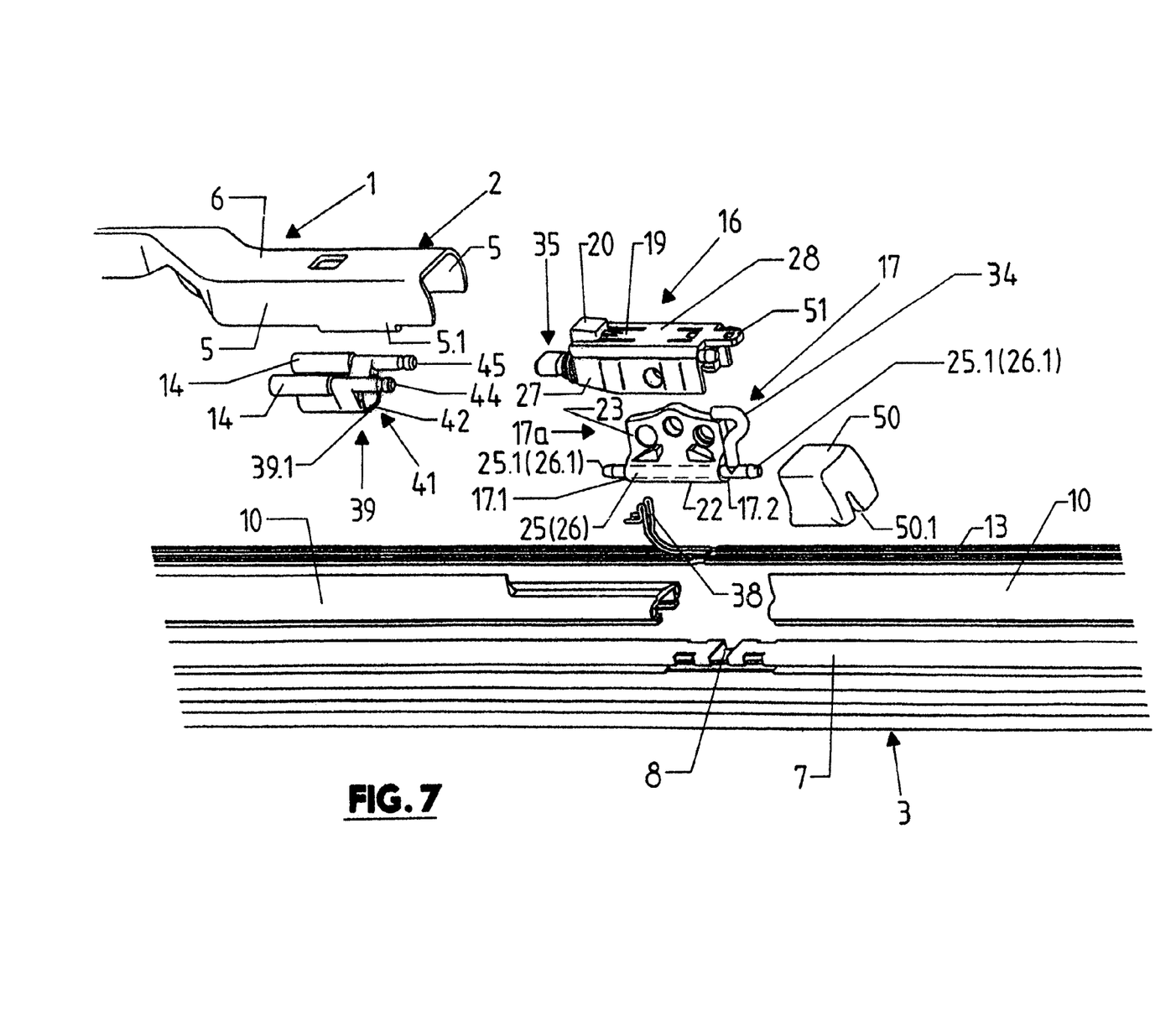
FIG. 7 shows a perspective exploded view of the wiper arm together with elements of the wiper blade, the adapter sections of the two-part wiper blade adapter and with a coupling unit on the wiper arm side for establishment of a hydraulic and electric connection between the external hydraulic lines and electric leads and the wiper blade.
Figure 8:
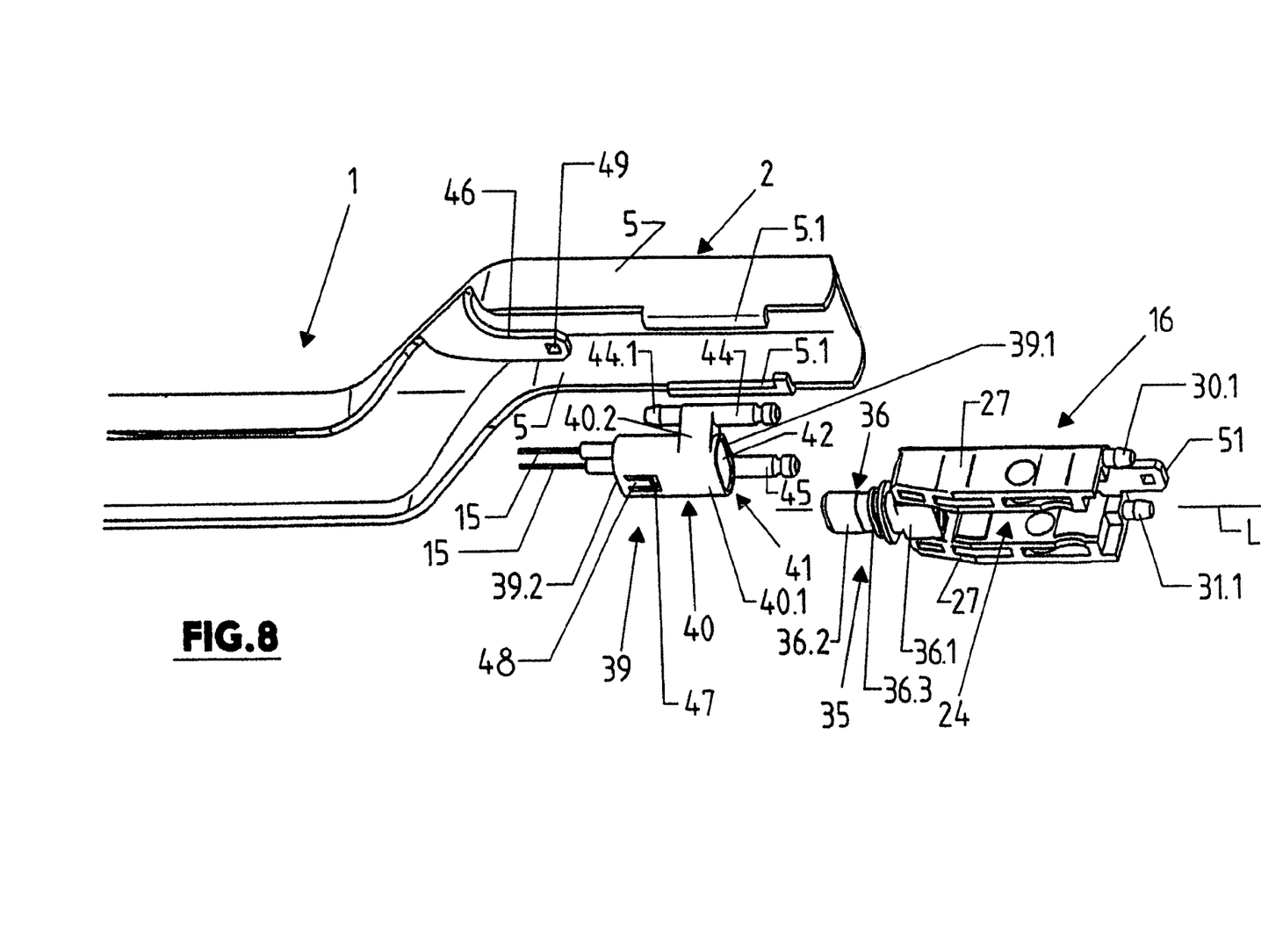
FIG. 8 shows an illustration similar to that of FIG. 5, but with the coupling unit on the wiper arm side removed from the wiper arm.
Figure 9:
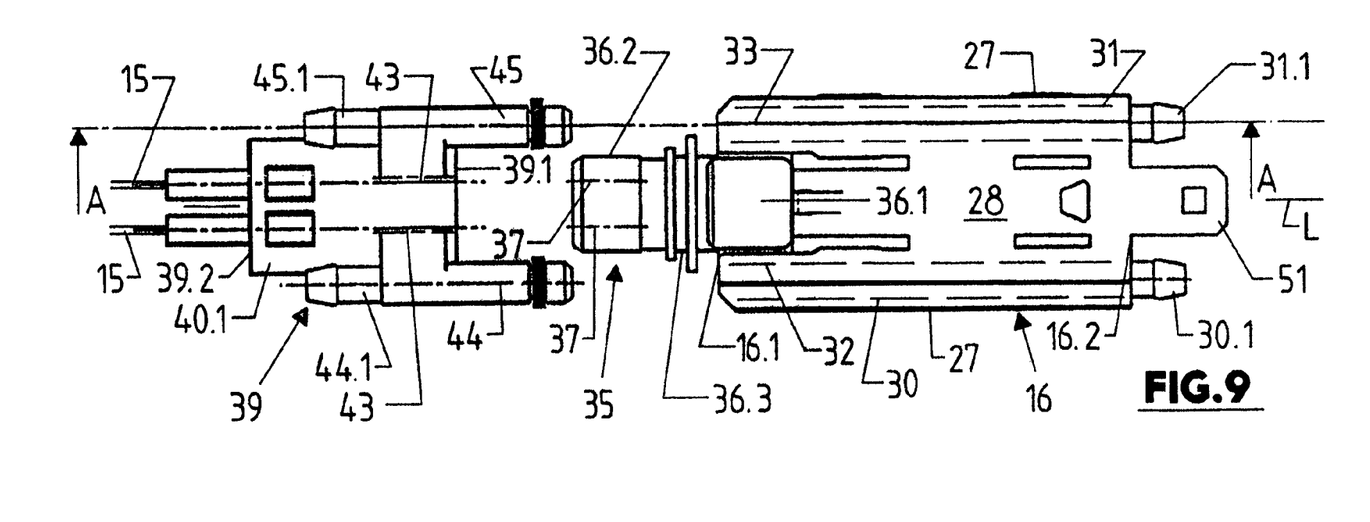
FIG. 9 shows a top view of the adapter section on the wiper arm side and the coupling unit on the wiper arm side with the adapter section separated from the coupling unit.
Figure 10:
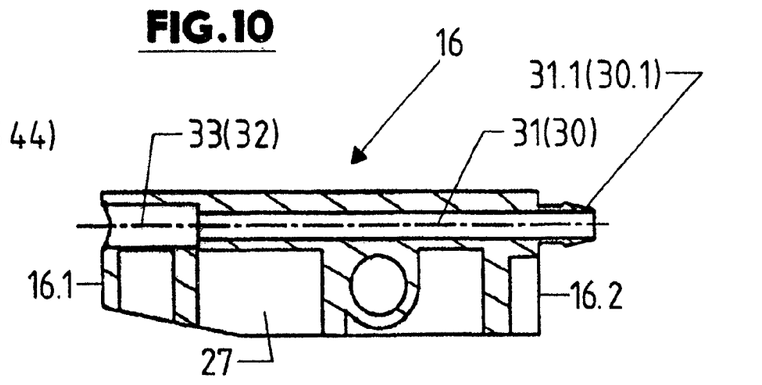
FIG. 10 shows a section according to the line A-A in FIG. 9.
Figure 11:
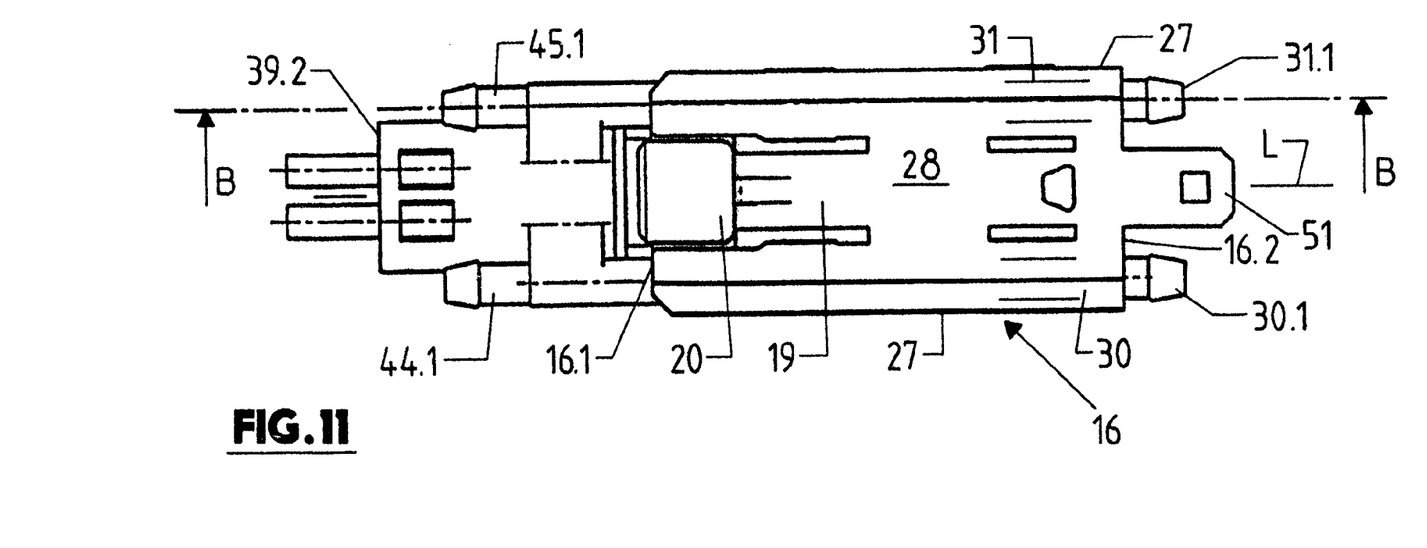
FIG. 11 shows an illustration similar to that of FIG. 9, but with the adapter section connected to the coupling unit.
Figure 12:
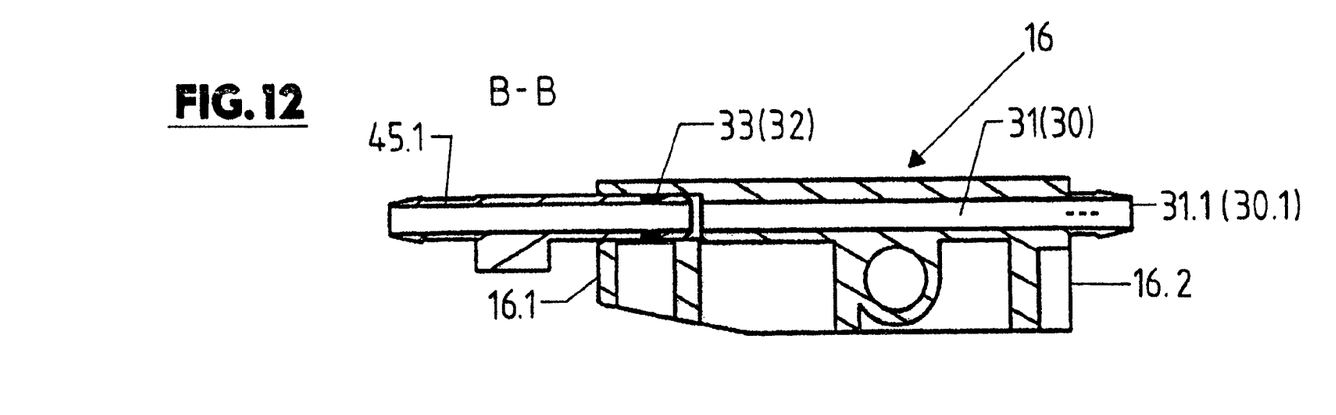
FIG. 12 shows a section according to the line B-B in FIG. 11.

In order to allow the fixing of the adapter section 17 to the wiper blade 3 in the manner of a slide, this adapter section is, for its part, in the embodiment presented of two-part design and to be more precise, consisting of two identical and identically shaped mouldings 17a, connected adjacently together on a central plane of the adapter section 17 in relation to which this adapter section 17 is designed mirror-symmetrically. The two mouldings 17a are realised such that the adapter section 17 forms a section overlapping the wiper blade 3 in the manner of a slide and in FIGS. 2 and 7 a lower section 22 and adjoining the latter forms an upper plate-like section 23 in these figures, on which the two mouldings 17a are also connected to each other in a suitable manner and which with the wiper blade adapter 4 installed, projects into a recess 24 in the adapter section 16 and on pivoting around the axis of the hinge bolt 18, is guided with the section 23 in this recess 24. In the section 22, the adapter section 17 is designed with two flow or fluid ducts 25 and 26, each of which extends on one longitudinal side of the adapter section 17 in the longitudinal direction L of this adapter section and which respectively form at both ends connecting pieces 25.1 and 26.1 projecting over the front faces 17.1 and 17.2 of the adapter section 17 oriented vertically in relation to the longitudinal extension or longitudinal direction L of the adapter section 17 and the wiper blade 3 and by means of which the flow duct 25 is connected to the spray duct 11 and the flow duct 26 is connected to the spray duct 12 of the wiper blade 3.

The recess 24, the width of which is adapted to the thickness of the plate-like section 23 vertically to the longitudinal direction L of this adapter section, i.e. is identical to or slightly larger than this thickness, is limited by two wall sections 27 of the adapter section 16. The two lateral wall sections 27 form together with an upper wall section 28 forming the upper side of the adapter section 16 and presenting the moulded spring tongue 19, a U profile for the adapter section 16. The hinge bolt 18 reaching through a joint opening 29 in the section 23 is supported at both ends in the two wall sections 27.

At the transition between one wall section 27 and the wall section 28 respectively, flow ducts 30 and 31 are designed in the adapter section 16, of which each is provided on one longitudinal side of the adapter 16 and in the area of the transition at this point between the wall section 27 and the wall section 28 and extends in the longitudinal direction L of the adapter section 16. On a front face 16.1 oriented vertically to the longitudinal extension or longitudinal direction L of the wiper blade adapter 4 and the wiper blade 3, each flow duct 30 and 31 is designed with an independent hydraulic or fluid connection and to be more precise, the flow duct 30 with the fluid connection 32 and the flow duct 31 with the fluid connection 33. On the front face 16.2 facing away from the front face 16.1, each flow duct 30 and 31 presents a connecting piece 30.1 and 31.1 projecting over this front face 16.2. A connecting or flexible tube piece 34 made of highly flexible material, for example a highly flexible plastic, e.g. EPDM or TPE, forming a fluid connection internal to the adapter is respectively connected at one end to each connecting piece 30.1 and 31.2. The other end of each flexible tube piece 34 is connected to a flow duct 25 or 26 of the adapter section 17 and indeed such that the flow duct 30 is connected to the flow duct 25 and the flow duct 31 is connected to the flow duct 26. The two flexible tube pieces 34 are located in this case on the front faces 16.2 and 17.2 of the adapter sections 16 and 17 and are curved over at least a sublength such that as a result of this curvature and use of the highly elastic material, impediment of the oscillating movement of the adapter section 17 in relation to the adapter section 16 does not occur.

On the front face 16.1 of the adapter section 16, an electrical connection 35 is furthermore provided projecting in the manner of a plug over this front face in the longitudinal direction L of the adapter section 16, formed in the embodiment presented of a moulded body 36 made of plastic, a section 36.1 of which is retained on the adapter section 16 in the area of the front face 16.1 and a section 36.2 of which projects over this front face. The moulded body 36 is designed with a section 36.3 acting as a seal between the two sections 36.1 and 36.2. The moulded body 36 is preferably retained floating in the adapter section 16 by the section 36.1 and indeed such that limited possibility of movement of the moulded body 36 in axes vertically to the longitudinal direction L of the adapter section 16 exists, as implied in the figures by the double arrows B and C. Two socket-like electrical contacts 37 are provided in the moulded body 36, each connected by means of an electrical lead 38 internal to the adapter to a connection of the heating element 13 and to be more precise in the area of the adapter section 17. The two electrical leads 38, which therefore extend between the connection 35 and the adapter section 16 and the adapter section 17, are located protected from outside influences in the embodiment presented within the space of the recess 24 not taken up by the section 23.

The two fluid connections 32 and 33 in addition to the electrical connection 35 are arranged on the front face 16.1 in a triangular formation such that the fluid connections 32 and 33 are located above the electrical connection 35 and furthermore the adapter section 16 is also designed with regard to the position of the fluid connections 32 and 33 in addition to the electrical connection 35 mirror-symmetrically to a central plane including the longitudinal axis or longitudinal direction L of the adapter section 16 and oriented vertically in relation to the upper side of this adapter section and vertically in relation to the axis of the hinge bolt 18.

In order to establish the electrical and fluid connection between the wiper blade adapter 4 and therefore the wiper blade 3 and the at least one external electrical connecting lead 15 and the external fluid lines 14, an electrical/hydraulic coupling unit 39 is provided and indeed in the receptacle 2 in such a manner that on establishing the mechanical connection between the wiper blade adapter, the electrical and hydraulic connection of the wiper blade adapter 4 and therefore the wiper blade 3 is made with the at least one connecting lead 15 and the fluid lines 14.

The coupling unit 39 in the embodiment presented consists of a moulding 40 manufactured from a suitable material, for instance plastic, one section 40.1 of which initially forms an electrical connection 41 on the wiper arm side and to be more precise in the form of an opening 42 in which two pin-shaped electrical contacts 43 are received and into which the section 36.2 can be inserted matching in order to establish the electrical connection between the wiper blade 3 and the wiper arm 1, such that the pin-shaped contacts 43 engage respectively in a socket-like contact 37 of the connection 35 and the section 36.3 designed as a seal tightly close towards the exterior the opening 42 and therefore the two-pole electrical connection established through the connections 35 and 41 and through the contacts 37 and 43. Each contact 43 is connected to an external lead 15.

The coupling unit 39 and the latter's moulded body 40 furthermore presents two plug-like fluid connections 44 and 45, respectively connected by means of a web-like section 40.2 to the section 40.1 and projecting over the front face 39.1 of the coupling unit 39 presenting the electrical connection 41 and the opening 42.

The electrical leads 15 are led sealed out of the section 40.1 of the moulded body 40 on the front face 39.2 facing away from the front face 39.1. The arrangement of the electrical connection 41 and the opening 42 and the fluid connections 44 and 45 on the front face 39.1 corresponds to the arrangement of the electrical connection 35 and the fluid connections 32 and 33 on the front face 16.1 of the adapter section 16, so that on establishing the electrical connection between the two connections 35 and 41 by inserting the pin-like fluid connections 44 and 45 into the fluid connections 32 and 33 formed by openings, the fluid connection between the two fluid lines 14 and the wiper blade 3 is simultaneously established and to be more precise, the connection between the one fluid line 14 and the spray duct 11 by means of the fluid connection introduced sealed into the fluid connection 32 and the connection between the fluid line 14 and the spray duct 12 by means of the fluid connection 45 introduced sealed into the fluid connection 33. Each fluid connection 44 and 45 is connected in terms of flow to a connecting piece 44.1 and 45.1, respectively projecting over the side of the corresponding web-shaped section 40.2 facing away from the fluid connection 44 and 45 and to which an external fluid line 14 is respectively connected.

In order to facilitate establishment of the electrical connection and the fluid connections between the adapter section 16 and the coupling unit 39, the fluid connections 44 and 45 are designed in such a manner for example that the length of these fluid connections projecting over the front face 39.1 is somewhat greater than the length by which the electrical connection 35 and the latter's moulding 36 projects over the front face 16.1, such that on connecting the adapter section 16 to the coupling unit 39, the pin-like fluid connections 44 and 45 initially engage in the fluid connections 32 and 33 formed by openings and during further docking of the adapter section 16 on the coupling unit 39 and during insertion of the connection 35 into the electrical connection 41 and into its opening 42, the adapter section 16 is guided on the pin-like fluid connections 44 and 45. Any tolerances present are compensated on connecting the electrical connections 35 and 41 by the floating attachment of the connection 35 to the adapter section 16.

The coupling unit 39 is fixed in the receptacle 2 and on the end of this receptacle distant from the free end of the wiper arm 1 and indeed such that the axes of the opening 42 of the electrical connection 41 and of the pin-like fluid connections 44 and 45 are oriented respectively parallel to one another and parallel to the assembly direction A, so that on inserting the adapter section 16 into the receptacle 2 in the assembly direction A, i.e. from the free end of the wiper arm, not only is the mechanical connection already mentioned above between the wiper blade adapter 4 and therefore the wiper blade 3 and the wiper arm 1 with locking of the catch 20 on the mating catch 21 established, but simultaneously also by insertion of the fluid connections 44 and 45 into the fluid connections 32 and 33 on the adapter side and by insertion of the electrical connection 35 into the electrical connection 41, the hydraulic connection or fluid connection and the electrical connection between the wiper arm 1 and the wiper blade adapter 4 and the wiper blade 3 are established.

In the embodiment presented, the coupling unit 39 is retained by catch engagement on a lug 46 shaped from the flat material of the wiper arm 1 by punching and bending. The lug 46 is bent in this case such that its free end presenting the recess 47 protrudes into the inside of the U profile forming the recess 2. In the area of its section 40.1, the moulding 40 is provided with a recess 47, which is open on the front face 39.2 and into which the lug 46 can be inserted matching. In the area of the recess 47, the moulding 40 is furthermore realised with a spring tongue 48, having a catch projecting into a recess 47, which (catch) after pushing the moulding 40 on to the lug 46 engages on a mating catch 49 formed at this position by an opening, as a result of which a very simple yet reliable installation of the coupling unit 39 in the receptacle 2 is achieved.

50 denotes a cap formed for example of plastic, which after installation of the wiper blade adapter 4 and the wiper blade 3 on the wiper arm 1 can be pushed on to a lug 51 manufactured in one piece with the adapter section 16 and projecting over the front face 16.2 and can be locked by catch engagement on this lug, such that the cover cap 50 not only visually forms a conclusion to the wiper arm 1 at its free end, but also receives the two connections and flexible tubes 34 and covers these towards the exterior. The cap 50 is equipped with a recess 50.1 on which the cap 50 overlaps the spoiler-like section 10 in the manner of a slide for additional securing.

The invention has been described above based on an example of embodiment. It is understood that modifications and variations are possible without departing as a result from the concept on which the invention is based. Common to all examples of embodiment however is the fact that on establishing the mechanical connection with the wiper blade 3, the hydraulic connection for supplying the cleaning and washing fluid to at least one spray duct or to at least one jet opening on the wiper blade side or jet in addition to the electrical connection between the wiper blade and the wiper arm is established and to be more precise, by means of the adapter section of the wiper blade adapter on the wiper arm side, i.e. by means of the adapter section of the wiper blade adapter that is detachably connected to the wiper arm by means of the mechanical connection.

It is therefore possible for example to design the electrical connecting leads 15 as heating leads and indeed for example such that these electrical leads 15 are provided running as heating or resistor wires in the fluid ducts 14. Consequently, heating of the supply or fluid lines 14 for the cleaning or washing fluid is simultaneously achieved using simple means. It is furthermore also possible to provide, in addition to the connecting leads 15, for heating the fluid ducts 14 heating or resistor wires acting as electrical heating elements within the latter, with the electrical leads 15 being arranged to run outside the fluid ducts 14 for example.

Figure 13:
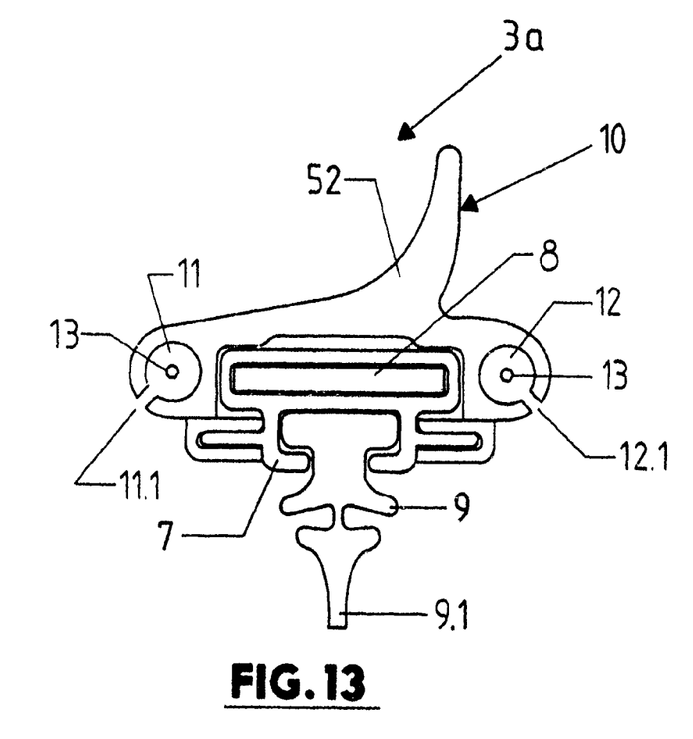
FIGS. 13 and 14 show sections through other flat wiper blades.
Figure 14:
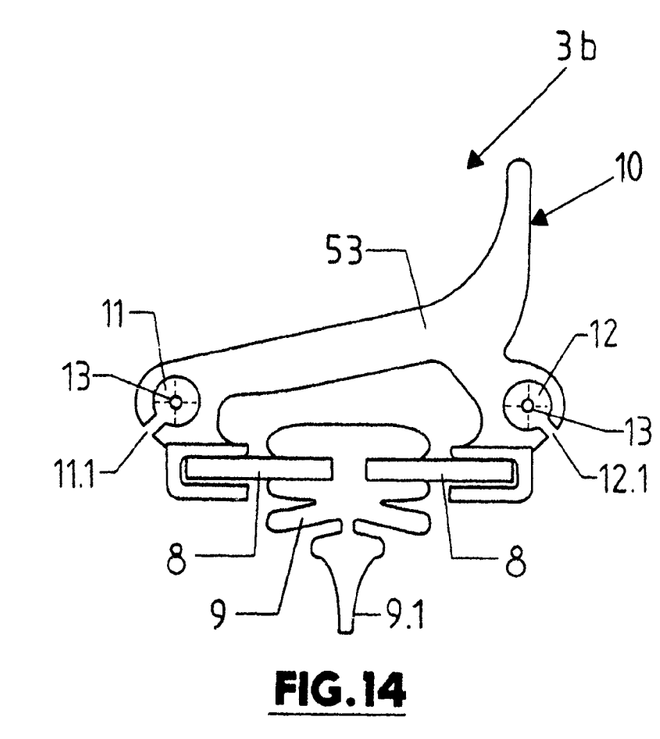

It was assumed above that the heating element 13 is formed of a heating foil. In principle, the heating element 13 may also be a heating or resistor wire extending within the spray ducts 11 and 12 which forms at least one closed electrical heating current circuit. FIGS. 13 and 14 illustrate examples of this.

In the case of the flat wiper blade 3a illustrated in cross-section in FIG. 13, a spoiler profile 52 made of plastic forming the spoiler 10 is fixed to the profile rail 7. The two spray ducts 11 and with the corresponding jet openings 11.1 and 12.1 are designed in this spoiler profile. A heating or resistor wire is provided running in each spray duct 11 and 12 forming at least a length of the heating element 13 on the wiper blade side.

The flat wiper blade 3b illustrated in cross-section in FIG. 14 does not present the profile rail 7. In this wiper blade 3b, two spring rails 8 respectively extending over the entire length of the wiper blade are provided, between which the wiper rubber 9 is retained by a portion of the width of the spring rails 8 respectively engaging in recesses in the wiper rubber 9. The areas of the spring rails 8 projecting from the wiper rubber are overlapped by a wiper blade element designed as a spoiler profile made of plastic in this embodiment. The spray ducts 11 and 12 with the jet and spray openings 11.1 and 12.1 are designed in the spoiler profile 53. The heating element 13 on the wiper blade side is in turn formed of lengths of a heating and resistor wire running in the spray ducts 11 and 12.

It is understood that the heating element 13 on the wiper blade side may also be of different design in the case of the wiper blades 3a and 3b, for example made of heating foil.

The invention claimed is:

1. A wiper arm/wiper blade connection between a wiper blade and a wiper arm of a windscreen wiper module for vehicles, comprising:
    a wiper blade adapter provided on the wiper blade for detachable mounting of the wiper blade on the wiper arm,
    wherein the wiper blade is a flat wiper blade comprising:
        on at least one wiper blade longitudinal side, at least one spray duct having jet openings for application of a washing fluid to a vehicle windscreen, and
        at least one fluid connection on the wiper blade adapter on an adapter side, wherein the at least one fluid connection is for detachable connection of the at least one spray duct to at least one external fluid line for supplying the washing fluid, wherein the at least one fluid connection is facilitated by a coupling unit connected to the at least one external fluid line and detachably connected to the wiper blade adapter,
    wherein the wiper blade is an electrically heatable wiper blade, and
    wherein the wiper blade adapter comprises at least one electrical connection, which is detachably connected by the coupling unit to at least one external electrical lead for supplying the heating current to the wiper blade.

2. The connection according to claim 1, wherein the wiper blade adapter is a two-part design with a first adapter section on the wiper arm side detachably connected to the wiper arm and a second adapter section on the wiper blade side connected to the wiper blade, and wherein the at least one fluid connection and the at least one electrical connection on the adapter side are provided on the first adapter section.

3. The connection according to claim 2, wherein at least one fluid connection corresponding to the at least one fluid connection on the wiper blade adapter and at least one electrical connection corresponding to at least one electrical connection on the wiper blade adapter are provided on the coupling unit.

4. The connection according to claim 3, wherein both the at least one fluid connections and the at least one electrical connections are realized as plug or socket connections, and/or that at least two fluid connections allocated to each other and/or at least one single-pole electrical connection respectively are provided on the wiper blade adapter and on the coupling unit.

5. The connection according to claim 3, wherein the wiper arm comprises a receptacle in which the wiper blade adapter or an adapter section on the wiper arm side is fixed by insertion in an assembly direction, wherein the coupling unit is arranged in the receptacle such that on inserting the wiper blade adapter or the first adapter section in the assembly direction, the connection between the at least one fluid connection on the adapter side and the corresponding at least one fluid connection provided on the coupling unit and the electrical connection between the at least one electrical connection on the adapter side and the at least one electrical connection provided on the coupling unit is established.

6. The connection according to claim 5, wherein the receptacle on the wiper arm presents an opening formed on a free end of the wiper arm for insertion of the wiper blade adapter or the first adapter section and wherein the coupling unit is provided on a side of the receptacle opposite the opening of the receptacle.

7. The connection according to claim 2, wherein the at least one fluid connection on the first adapter section is connected, by at least one flow connection on the wiper blade adapter, to at least one flow duct in the second adapter section, and wherein the at least one flow duct is linked to the at least one spray duct.

8. The connection according to claim 7, wherein on both wiper blade longitudinal sides, at least one spray duct is provided and that the at least one spray duct on each longitudinal side is connected by means of an own flow duct designed in the second adapter section and an own connection internal to the adapter to an own fluid connection on the first adapter section.

9. The connection according to claim 8, wherein the fluid connection internal to the adapter is formed of a flexible tube or flexible tube piece.

10. The connection according to claim 1, wherein at least the electrical connection and the coupling unit are floatingly mounted.

11. The connection according to claim 1, wherein the at least one external electrical lead for supplying the heating current to the wiper blade and the at least one fluid line run at least over a sublength of the wiper arm.

12. The connection according to claim 1, wherein the at least one external electrical lead runs at least over a sublength within at least one fluid line, where the lead is realized by a heating or resistor wire in order to form an electrical heating element.

13. The connection according to claim 1, wherein the coupling unit is retained by catch engagement on a lug provided on the wiper arm and manufactured in one piece with the wiper arm.

14. A wiper blade for a windscreen wiper module for vehicles, comprising:
a wiper blade adapter provided on the wiper blade for detachable mounting of the wiper blade on the wiper arm,
wherein the wiper blade is a flat wiper blade comprising:
on at least one wiper blade longitudinal side at least one spray duct having jet openings for application of a washing fluid to a vehicle windscreen, and
at least one fluid connection on the wiper blade adapter on an adapter side for detachable connection of the at least one spray duct to at least one external fluid line for supplying the washing fluid,
wherein the at least one fluid connection is facilitated by a coupling unit connected to the at least one fluid line and detachably connected to the wiper blade adapter,
wherein the wiper blade is an electrically heatable wiper blade,
wherein the wiper blade adapter comprises at least one electrical connection for connection to at least one corresponding electrical connection on the wiper arm side.

15. The wiper blade according to claim 14, the wiper blade adapter is a two-part design with a first adapter section on the wiper arm side detachably connectable to the wiper arm and with a second adapter section on the wiper blade side connectable to the wiper blade, and wherein the at least one fluid connection and the at least one electrical connection on the adapter side are provided on the first adapter section.

16. The wiper blade according to claim 15, wherein the at least one fluid connection on the first adapter section is connected by at least one flow connection on the wiper blade adapter to at least one flow duct in the second adapter section, wherein the at least one flow duct is linked to the at least one jet opening or to the at least one spray duct.

17. The wiper blade according to claim 16, wherein, on both wiper blade longitudinal sides, at least one jet opening and/or at least one spray duct is provided, and wherein the at least one jet opening and/or the respective spray duct on each longitudinal side is connected by an own flow duct in the second adapter section and an own connection internal to the adapter to an own fluid connection on the first adapter section.

18. The wiper blade according to claim 17, wherein the fluid connection internal to the adapter is formed of a flexible tube or flexible tube piece.

19. The wiper blade according to claim 14, wherein the at least one fluid connection and the at least one electrical connection are realized as plug or socket connections, and wherein at least two fluid connections and/or at least one single-pole electrical connection are provided on the wiper blade adapter.

20. The wiper blade according to claim 14, wherein at least the electrical connection is floatingly mounted.

* * * * *